United States Patent Office 3,315,536
Patented Apr. 25, 1967

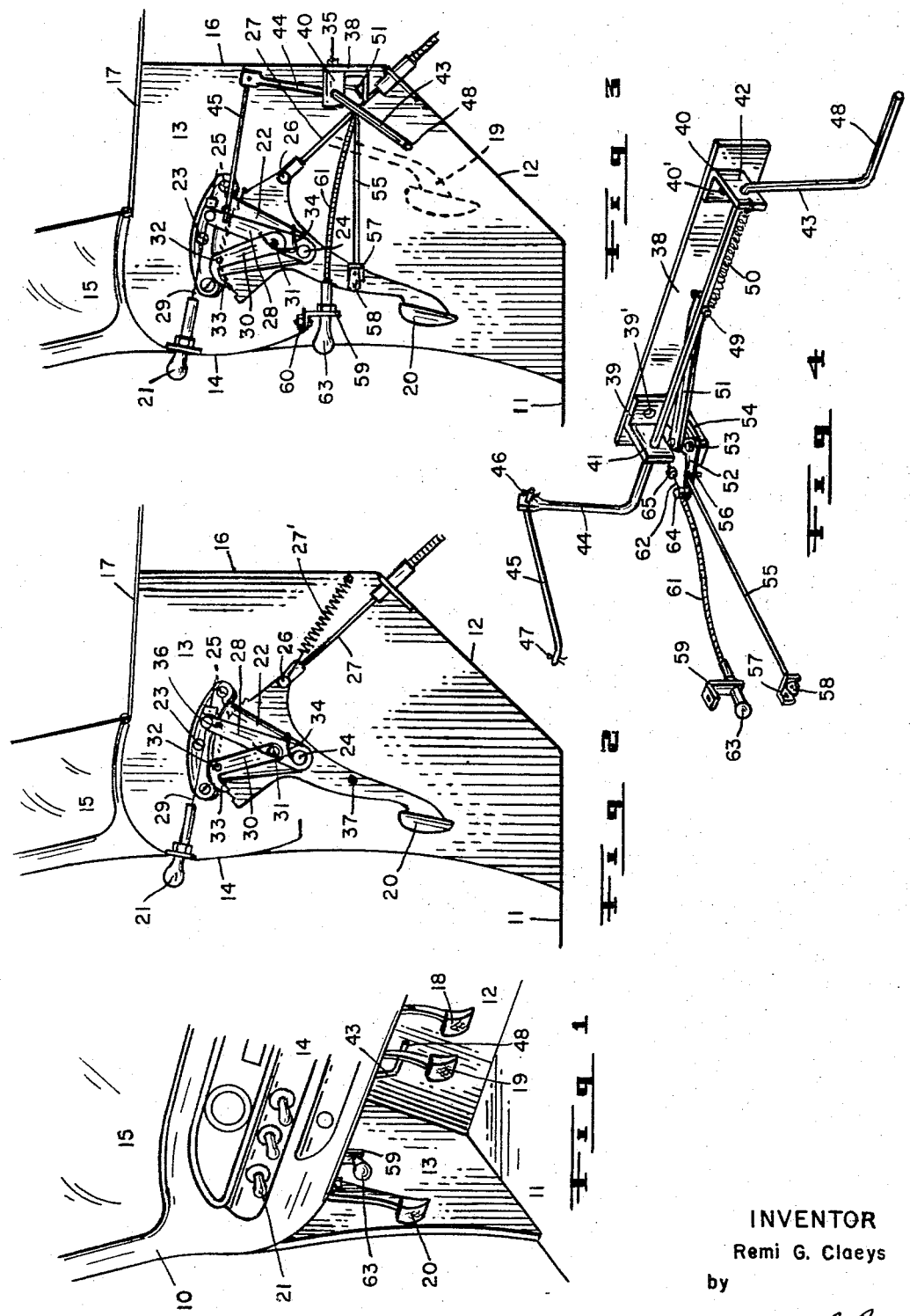

3,315,536
AUTOMOBILE BRAKE RELEASES
Remi G. Claeys, 925 Melrose Ave. E., Transcona,
Manitoba, Canada
Filed July 31, 1964, Ser. No. 386,528
2 Claims. (Cl. 74—480)

The present day automobile, generally referred to in this specification as a "car," is usually provided with two brakes for stopping the ground wheels thereof from turning, namely; the "Service" or standard brake and the "Emergency" or parking brake. The service brake is operated by the right foot of the driver pressing a pedal and is generally used for all slowing down or stopping purposes when the car is operated. The emergency brake on the other hand is principally operated by the left foot of the driver pressing a pedal to adjusted positions, from which it can be later released, and is used for holding the car stationary against gravitational movement, such as when parked on a slope. It can also be used in an emergency, especially if the service brake should fail. It is therefore important that the emergency brake be in good condition at all times. It should also be mentioned that many drivers find there is an advantage in having the emergency brake on slightly when driving on slippery surfaces, such as ice.

Some drivers have the habit of applying the emergency brake each time the car is parked. Naturally, their first instinct, before driving away again, is to release this brake. The majority of drivers however only use the emergency brake when parking on a slope, or when they think the car might have a tendency to move while they are away from it. Accordingly, they are inclined to forget upon their return and drive away without releasing the brake. Present day motors are so powerful the drag is not noticed until the brakes catch on fire or become worn out. In the one case, the car may be destroyed. In the other, an expensive re-lining of the brakes is necessary. If the lining is not replaced, a dangerous accident might result.

The principal object of the present invention is: to provide a simple attachment for automatically releasing the applied emergency brakes, when the clutch or accelerator of the car is foot pressed to operate the vehicle, depending of course on whether the drive is gear-shift or automatic.

A further object of the invention is: to attach the releasing device to the car without interfering with the present emergency brake operation, other than said automatic release.

A further object of the invention is: to provide means for manually neutralizing or rendering the attachment inoperative, when the driver so wishes.

Still further objects of the invention are: to construct the device in a simple manner for ease of manufacture and low cost of production, including ease of attachment to the car; design same in a rugged manner for many years of satisfactory untroubled efficient operation; and positioned out of sight and free from interference with the movements of the driver, yet readily accessible for repairs or replacements, if such should be needed.

With the above important and other minor objects in view, which will become more apparent as the description proceeds, the invention consists essentially in the design, construction and arrangement of the various parts hereinafter more particularly described, reference being had to the accompanying drawings wherein like characters of reference indicate corresponding parts in the several figures, and wherein:

FIGURE 1 is a perspective view of the driver's corner of a car, showing the foot pedals and their relation to the various parts of the attached invention.

FIGURE 2 is a vertical section through the dash of the car and showing a standard emergency brake mechanism as at present used.

FIGURE 3 is the same as FIGURE 2 but showing the invention attached to the car and in operable connection with the emergency brake mechanism.

FIGURE 4 is an enlarged perspective view of the invention by itself, as an attachment for installation on a car.

The driver's corner of a car is shown in perspective in FIGURE 1 of the drawings and, with the exception of the steering post and gear shift, presents most of the operating controls therefor. The car itself is generally indicated by the reference 10 and presents a floor 11, foot board 12, side wall 13, instrument panel 14 and windshield 15. The partition or firewall 16 at the top of the foot board and the hood 17 are indicated in FIGURES 2 and 3. The service brake pedal is shown at 18, the clutch pedal 19 (one of the driving controls) at the side thereof, the emergency brake pedal 20 along the side wall, and the hand release for same on the instrument panel at 21.

As the present invention is so closely associated with the working parts of the emergency brake mechanism, a full understanding of this control construction and its operation is necessary, in order to appreciate the operation and advantages of the invention. Accordingly, the following remarks are generally directed to this purpose.

A triangular-shaped bracket 22 (see FIGURE 2) has its upper end supported on the side wall 13 behind the instrument panel, and by screws or bolts 23. This bracket is of Z-shaped design in vertical cross section, so the lower part thereof is spaced from the wall to receive the upper end of the emergency brake pedal 20 therebehind, the pedal being pivoted thereto at 24. The arced upper end of the pedal, above the pivot 24, is provided with ratchet teeth 25, while its front side is extended at 26 to pivotally receive the upper end of a cable 27 which passes down through the foot board 12 to operate the emergency brake mechanism at the wheels. Springs 27' resiliently pull on this cable to normally hold the pedal 20 in the position shown. Actually, these springs are on the brake connections under the car, but to save extra drawing they are here shown in FIGURE 2, so a complete understanding is obtained of the operation.

A lever 28 also has its lower end pivoted on the pedal pivot 24. This lever is exterior of the bracket 22, while its upper end is connected by a wire 29 with the hand release knob 21 on the instrument panel. A second lever 30 has its lower end slotted (not shown) for pivoting and riding movements on a pin 31 carried by the lever 28. The upper end of this second lever is pivoted at 32 to the main bracket 22 and provided with a rear extending leg or dog 33, which is adapted to ride in the ratchet teeth 25 of the emergency pedal. A spring wire 34 has one end thereof hooked to the bracket 22, takes a turn around the pivot point 24, and then presses against the pivot pin 31 to resiliently push the lever 28 ahead, hold the wire 29 under tension. and also hold the dog 33 in the ratchet teeth 25.

When the emergency brake pedal 20 is foot pressed, the cable 27 is pulled against the springs 27' mentioned to operate the emergency brakes on the wheels, and the ratchet teeth slip past the dog 33 to adjust the pedal 20 to different set positions of said brakes. By hand pulling the release 21 on the instrument panel, the wire 29 operates the lever 28 to swing the lever 30 and lift the dog 33 on its pivot 32, and from the ratchet teeth 25. Accordingly, the brake springs 27' pull the emergency pedal 20 back to the position shown in the drawings.

The invention itself is shown in FIGURE 4, and in order to attach it to the car, a pair of spaced horizontal holes (not shown) are required through the partition 16, where the bolt 35 is shown in FIGURE 3. A hole 36 is drilled through the lever 28 (FIGURE 2) and another hole 37 is drilled through the emergency brake pedal 20.

The invention comprises a lengthwise panel 38 which receives brackets 39 and 40 thereon, one at each end thereof. Holes 39' and 40' are drilled through the brackets and the panel so the assembly can be attached to the partition 16 by the bolts 35, as shown in FIGURE 3. The bracket 39 has an outward extension 41 and the bracket 40 has an outward extension 42. These two extensions form bearings to slidably and rotatively receive a Z-shaped shaft 43 therethrough. The far end of this shaft, being bent upwardly, forms a crank 44 which has the extreme end flattened and drilled to receive the hooked end of a pitman link 45. The opposite end of this link is side bent to enter the hole 36 in the lever 28 of the brake control mechanism, the said end also being held therein by a cotter pin 47. The forward end of the bracket supported shaft 43 is bent downwardly at a slant, and then ahead again, as shown at 48, to provide a further crank. The central part of the shaft 43, between the brackets, is connected at 49 to one end of a coil spring 50. The opposite end of the spring is connected to the bracket 40 so its resiliency is normally adapted to end-move the shaft 43 on the brackets. A twisted pitman 51 has one end thereof also connected to the shaft 43 at the point 49. Its opposite end is pivotally connected to the short arm of a bell crank 52. This bell crank is pivotally mounted at 53 to a lower extension 54 of the bracket 41. A rod 55 has one end hooked at 56 to the long arm of the bell crank, and is suitably held thereto by a cotter pin (not shown). The opposite end of the rod 55 passes through an L-shaped bracket 57, and then provided with a knob 58 to prevent escape. The bracket 57 is bolted through the hole 37 to the emergency brake pedal. An inverted L-shaped bracket 59 is connected under the bottom edge of the instrument panel 14, as by a bolt 60. This bracket is provided with a flexible cable 61 which passes ahead as a protection for an inner wire 62 which slidably moves therethrough. One end of this wire is manually operable by a knob 63 at the bracket 59, while its opposite end slidably passes through a pivoted button 64 on the long arm of the bell crank 52, and is then provided with an adjustable stop 65 which is held thereon, such as by a set screw (not shown).

From the above it will be seen the invention is really a carefully designed linkage. In attaching this linkage to the car, the bolts 35 not only pass through and fasten the brackets 39 and 40 to the panel 38 but also secures the assembly to the partition 16, the pitman link 45 is connected to the lever 28, the bracket 59 is fastened to the dash, and the bracket 57 is held to the emergency brake pedal 20. The end 48 of the shaft 43 is then behind the clutch pedal 19, as shown in FIGURE 3.

In the position shown, the emergency brake pedal 20, through the rod 55, is holding the bell crank 52 against the resilience of the coil spring 50, and the end 48 of the shaft 43 is in retracted position, that is; clear of any possible contact by the clutch pedal 19. When the emergency brake pedal 20 is foot pressed however, the rod 55 is released and the coil spring 50 end-shifts the shaft 43 to slide the end 48 directly under or ahead of the clutch pedal 19. As the bell crank 52 will be turning in this operation, it will pull on the rod 55, so the knob 58 will follow the bracket 57 on the pedal 20. In the meantime, the emergency brakes will be applied, as previously explained. Further, as the bell crank turns, the pivoted button 64 slides along the wire 62, up to the stop 65.

At this time, no turning of the shaft 43 occurs, just end-shifting, and the ends of the pitman link 45 just pivot slightly to accommodate the movement, while the lever 28 remains stationary. Should the driver now attempt to drive away, he will have to press the clutch pedal 19 in order to shift gears. In this movement, the clutch pedal will strike the end 48 and rotate the shaft 43, thus rocking the opposite end lever 44, end-shifting the pitman link 45, and operating the lever 28. Accordingly, the dog 33 will be lifted from the ratchet teeth 25 in the same manner as if the release 21 on the instrument panel had been pulled, the pedal 20 is released, including the emergency brakes. As this pedal returns by the resilience of the springs 27', it causes the rod 55 to rotate the bell crank 52, bring the shaft 43 back to the position shown, and the end 48 is moved out of the road of the clutch pedal 19. In other words; the car just cannot be operated with the emergency brakes on, when this invention is in operation.

If the driver desires to drive the car with the emergency brakes on, such as when driving on ice, or for any other reason wishes to neutralize this releasing mechanism, it is only necessary for him to pull the knob 63. The wire 62 will be pulled through the cable 61 and the button 64, until the stop 65 contacts the button. The friction of the wire in the cable, or any small obstruction (not shown), will then be sufficient to prevent turning of the bell crank 52 and end-movement of the shaft 43 by the resilience of the spring 50. Accordingly, all parts shown in FIGURE 4 will stay inactive when the emergency brake pedal is foot pressed, except that the bracket 57 will make an idle movement along the rod 55 with the pedal. The knob 63 can be pulled for this neutralization at any time, whether the emergency brakes are off or on. If the brakes are applied when the knob 63 is pulled, the stop 65 will also be pulled, will turn the bell crank 52, and so return the shaft 43 to the position shown in FIGURE 4 and the end 48 from in front of the clutch pedal. By pushing the knob 63 back, the mechanism is again returned by the spring 50, to operable position for automatic release of the emergency brakes, when the clutch pedal is pressed.

It might be pointed out at this time that, when this release mechanism is installed, there is really no need for the hand release 21 on the instrument panel. In fact, this latter knob could be disconnected from the lever 28 and substituted for the knob 63 as the neutralizer, same being provided with the cable-enclosed wire 62 to the bell crank 52 in the same manner. The release of the emergency brakes would then be solely accomplished by just pressing the clutch pedal. The pulled-out knob on the dash would always warn the driver that the release mechanism is inoperative.

While the drawings specifically show operation of the releasing linkage by movement of the clutch pedal, it will be appreciated that the shaft end 48 could be similarly operated by the accelerator of an automatic car (one where a gear-shift is not used). As the motors of these cars automatically drive the wheels thereof when the accelerator is pressed, such a depression can also be used to rotate the shaft 43 in the same manner as explained for the clutch pedal, and so release the emergency brakes, and this can be done whether the emergency brakes are foot or hand operated.

What I claim as my invention is:

1. In combination with an automobile having a manually operable clutch pedal as a control in the driving of same; said automobile also having a mechanism operable by a foot pedal for applying brakes to the wheels thereof in adjusted locked positions, and against the resilience of a spring in said mechanism; said mechanism including a series of ratchet teeth on said foot pedal for movement past a pivoted dog meshable therewith for said adjusted locked positions; means for automatically unlocking said mechanism from said positions for release of said brakes by said spring, before operation of the automobile, comprising: a Z-shaped shaft rotatably mounted in a bearing on said automobile and presenting a crank at each end thereof; one of said cranks positioned for contact with, and shaft rotation by, said clutch pedal, when same is operated; the other of said cranks having means connected with said mechanism for demeshing the pivoted dog from said ratchet teeth, in said shaft rotation; and operable means for end-shifting said Z-shaped shaft to move said first mentioned crank clear of engagement with said clutch pedal when operated.

2. An emergency brake release attachment for an automobile, comprising: an elongated mounting panel for attachment to said automobile; a Z-shaped shaft rotatably mounted on said panel and presenting a crank at each end thereof; a bell-crank pivotally mounted on said panel, with one arm thereof linked to said shaft for end-shifting of same in the pivoting of said bell-crank; resilient means for end-shifting said shaft on said panel in one direction; one of said cranks adapted for rotation of said shaft by contact with a driving control on said automobile, when said control is operated; means for operably connecting the other of said cranks and the opposite arm of said bell-crank to members of the emergency brake of said automobile; and manual control means connected to said bell-crank for pivoting said bell-crank in a direction opposing said resilient means.

References Cited by the Examiner
UNITED STATES PATENTS

| | | | |
|---|---|---|---|
| 1,275,702 | 8/1918 | Kloneck | 192—13 |
| 1,876,498 | 9/1932 | Hawkins | 74—479 X |
| 2,490,473 | 12/1949 | Rodkey | 192—3 |
| 2,538,143 | 1/1951 | Brown | 74—480 X |
| 3,229,792 | 1/1966 | Hock | 74—560 X |

FRED C. MATTERN, JR., *Primary Examiner.*

C. F. GREEN, *Assistant Examiner.*